United States Patent
Seguchi et al.

(10) Patent No.: US 11,474,512 B2
(45) Date of Patent: Oct. 18, 2022

(54) MACHINING FAILURE DETECTION DEVICE, LASER CUTTING APPARATUS, AND ELECTRIC DISCHARGE MACHINING APPARATUS

(71) Applicant: Mitsubishi Electric Corporation, Tokyo (JP)

(72) Inventors: Masaki Seguchi, Tokyo (JP); Kyohei Ishikawa, Tokyo (JP); Teruaki Fukuoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/604,450

(22) PCT Filed: Feb. 25, 2020

(86) PCT No.: PCT/JP2020/007482
§ 371 (c)(1),
(2) Date: Oct. 18, 2021

(87) PCT Pub. No.: WO2020/250496
PCT Pub. Date: Dec. 17, 2020

(65) Prior Publication Data
US 2022/0147036 A1    May 12, 2022

(30) Foreign Application Priority Data
Jun. 13, 2019 (WO) .................. PCT/JP2019/023488

(51) Int. Cl.
*G05B 23/02* (2006.01)
*B23H 1/00* (2006.01)
(Continued)

(52) U.S. Cl.
CPC .......... *G05B 23/0262* (2013.01); *B23H 1/00* (2013.01); *B23K 26/03* (2013.01); *B23K 26/38* (2013.01);
(Continued)

(58) Field of Classification Search
CPC ........... G05B 23/0262; G05B 23/0235; G05B 23/0267; B23H 1/00; B23K 26/03; B23K 26/38
See application file for complete search history.

(56) References Cited

U.S. PATENT DOCUMENTS 4,857,912 A * 8/1989 Everett, Jr. ............ G08B 19/00
340/508
5,681,490 A * 10/1997 Chang .................. B23K 26/032
219/121.64
(Continued)

FOREIGN PATENT DOCUMENTS

JP   4-75822 A   3/1992
JP   5-77073 A   3/1993
(Continued)

OTHER PUBLICATIONS

International Search Report and Written Opinion dated Apr. 21, 2020, received for PCT Application PCT/JP2020/007482, Filed on Feb. 25, 2020, 9 pages including English Translation.
(Continued)

*Primary Examiner* — Santosh R Poudel
(74) *Attorney, Agent, or Firm* — Xsensus LLP

(57) ABSTRACT

A machining failure detection device includes a machining light measurement unit that measures machining light generated at a machining point during machining; a machining sound measurement unit that measures machining sound generated at the machining point; and a computation unit that determines whether a machining failure has occurred in
(Continued)

the machining. The computation unit includes a feature extraction unit, a determination value calculation unit, and a determination unit. The feature extraction unit extracts a machining light feature from a machining light signal measured by the machining light measurement unit, and extracts a machining sound feature from a machining sound signal measured by the machining sound measurement unit. The determination value calculation unit calculates a combined failure determination value on the basis of the machining light feature and the machining sound feature. The determination unit compares the combined failure determination value with a determination criterion to determine a failure.

12 Claims, 13 Drawing Sheets

(51) Int. Cl.
  *B23K 26/03* (2006.01)
  *B23K 26/38* (2014.01)
(52) U.S. Cl.
  CPC ..... *G05B 23/0235* (2013.01); *G05B 23/0267* (2013.01)

(56) References Cited

U.S. PATENT DOCUMENTS

| | | | |
|---|---|---|---|
| 10,664,767 | B2 | 5/2020 | Takigawa et al. |
| 10,780,577 | B2 | 9/2020 | Murakami et al. |
| 11,029,218 | B2 | 6/2021 | Uno et al. |
| 2006/0095232 | A1* | 5/2006 | Purdy ................ G05B 23/0221 702/185 |
| 2019/0219522 | A1* | 7/2019 | Izumi .................. B23K 26/707 |
| 2020/0315367 | A1* | 10/2020 | Demirli ................ A61B 5/1495 |

FOREIGN PATENT DOCUMENTS

| | | |
|---|---|---|
| JP | 6-246467 A | 9/1994 |
| JP | 2007-253197 A | 10/2007 |
| JP | 2011-206806 A | 10/2011 |
| JP | 2017-6955 A | 1/2017 |
| JP | 2017-164801 A | 9/2017 |
| JP | 2018-97810 A | 6/2018 |
| JP | 2018-140432 A | 9/2018 |
| JP | 2018-190428 A | 11/2018 |

OTHER PUBLICATIONS

Decision to Grant dated Aug. 4, 2020, received for JP Application 2020-533171, 5 pages including English Translation.

* cited by examiner

FIG.4
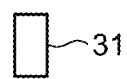
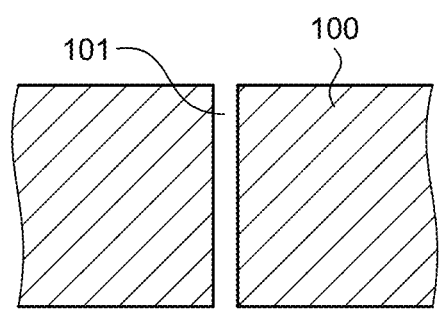
FIG.5
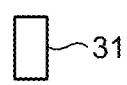
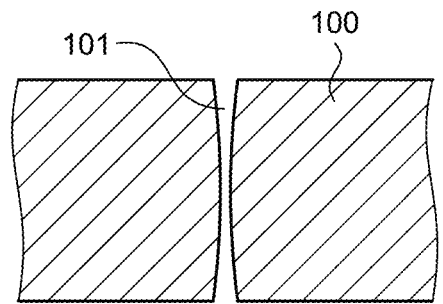

FIG.6

| | | MACHINING FAILURE DUE TO CUT SECTION BLOCKAGE | MACHINING FAILURE IN CUT SURFACE | |
|---|---|---|---|---|
| | | | THICK | THIN |
| RELATIVE DETECTION ACCURACY | MACHINING LIGHT | HIGH | LOW (UPPER PART: HIGH, LOWER PART: LOW) | HIGH |
| | MACHINING SOUND | HIGH | HIGH | LOW |

FIG.7

| MACHINING CONDITION | WEIGHT | |
|---|---|---|
| | MACHINING LIGHT | MACHINING SOUND |
| PLATE THICKNESS≥xx [cm] | 0.2 | 0.8 |
| PLATE THICKNESS<xx [cm] | 0.8 | 0.2 |
| | | |
| | | |
| | | |
| | | |

FIG.10

| MACHINING CONDITION | TYPE OF MACHINING FAILURE | | WEIGHT | |
| --- | --- | --- | --- | --- |
| | FIRST CLASSIFICATION | SECOND CLASSIFICATION | MACHINING LIGHT | MACHINING SOUND |
| PLATE THICKNESS >xx [cm] | MACHINING FAILURE DUE TO CUT SECTION BLOCKAGE | | 0.5 | 0.5 |
| | MACHINING FAILURE IN CUT SURFACE | UPPER PART | 0.5 | 0.5 |
| | | LOWER PART | 0.2 | 0.8 |
| PLATE THICKNESS <xx [cm] | MACHINING FAILURE DUE TO CUT SECTION BLOCKAGE | | 0.5 | 0.5 |
| | MACHINING FAILURE IN CUT SURFACE | | 0.8 | 0.2 |
| | | | | |
| | | | | |
| | | | | |
| | | | | |

FIG.13

| PRIORITY | MACHINING CONDITION | TYPE OF MACHINING FAILURE | | WEIGHT | |
| --- | --- | --- | --- | --- | --- |
| | | FIRST CLASSIFICATION | SECOND CLASSIFICATION | MACHINING LIGHT | MACHINING SOUND |
| SPEED | PLATE THICKNESS ≥xx [cm] | MACHINING FAILURE IN CUT SURFACE | UPPER PART | 0.5 | 0.5 |
| MACHINING QUALITY | | | | 0.5 | 0.5 |
| SPEED | PLATE THICKNESS <xx [cm] | | LOWER PART | 0.1 | 0.9 |
| MACHINING QUALITY | | | | 0.2 | 0.8 |
| | | | | | |
| | | | | | |
| | | | | | |
| | | | | | |

MACHINING FAILURE DETECTION DEVICE, LASER CUTTING APPARATUS, AND ELECTRIC DISCHARGE MACHINING APPARATUS

CROSS-REFERENCE TO RELATED APPLICATIONS

The present application is based on PCT filing PCT/JP2020/007482, filed Feb. 25, 2020, which claims priority to JP PCT/JP2019/023488, filed Jun. 13, 2019, the entire contents of each are incorporated herein by reference.

FIELD

The present invention relates to a machining failure detection device, a laser cutting apparatus, and an electric discharge machining apparatus that detect a failure in machining such as laser cutting and electric discharge machining.

BACKGROUND

In laser welding, welding quality is difficult to assess from observation of the appearance of the welded object, and thus is verified through examination of a welded cross section. However, it is not realistic to examine a welded cross section after welding. In view of this, Patent Literature 1 discloses a laser welding method in which at least one of machining light and machining sound generated during laser welding is measured with a sensor, and a feature including the intensity or amplitude of at least one of the measured machining light and machining sound is compared with a proper value during successful laser welding so that a machining failure can be detected.

CITATION LIST

Patent Literature

Patent Literature 1: Japanese Patent Application Laid-open No. 2007-253197

SUMMARY

Technical Problem

Patent Literature 1 is a technique related to laser welding, not a technique related to laser cutting. In laser cutting, cut object quality is verified through observation of the appearance of the cut object. In the event of a slight machining failure in the process of cutting, however, cut object quality cannot be verified during the laser cutting, and must be verified after completion of the laser cutting. There has been a demand for a technique that enables cut object quality to be verified in the process of laser cutting. In addition, a change in machining conditions including the material or thickness of the workpiece may cause variations in features acquired with the sensor. For the technique described in Patent Literature 1, the proper value is calculated on the basis of values measured with the sensor during successful laser welding, but those variations in features are not taken into consideration in calculating the proper value. Because of variations in features, it is impossible to set the proper value appropriately and improve the accuracy of detection of machining failure. Moreover, there has been a demand for a technique that can improve the detection of machining failure not only in laser cutting but also in other machining such as electric discharge machining, as compared to the prior art, under varying machining conditions.

The present invention has been made in view of the above, and an object thereof is to obtain a machining failure detection device capable of improving the detection of machining failure under the varying machining conditions.

Solution to Problem

In order to solve the above-described problems and achieve the object, a machining failure detection device of the present invention comprises: a machining light measurement unit to measure machining light generated at a machining point during machining; a machining sound measurement unit to measure machining sound generated at the machining point; and a computation unit to determine whether a machining failure has occurred in the machining. The computation unit includes a feature extraction unit, a determination value calculation unit, and a determination unit. The feature extraction unit extracts a machining light feature from a machining light signal measured by the machining light measurement unit, and extracts a machining sound feature from a machining sound signal measured by the machining sound measurement unit. The determination value calculation unit calculates a combined failure determination value on a basis of the machining light feature and the machining sound feature. The determination unit compares the combined failure determination value with a determination criterion to determine whether the machining failure has occurred.

Advantageous Effects of Invention

The machining failure detection device according to the present invention can attain the effect of improving the detection of machining failure under the varying machining conditions.

BRIEF DESCRIPTION OF DRAWINGS

FIG. 4 is a diagram illustrating an example in which the cut slit has a certain width as the workpiece and the machining light measurement unit illustrated in FIG. 3 are cut with a plane P passing through the machining light measurement unit and perpendicular to the direction of extension of the cut slit.

FIG. 5 is a diagram illustrating an example in which the cut slit has a certain width in a plane obtained by cutting the workpiece and the machining light measurement unit illustrated in FIG. 3 on the plane P passing through the machining light measurement unit and perpendicular to the extending direction of the cut slit.

FIG. 6 is a diagram illustrating an example of the relative accuracy with which each type of failure in laser cutting of the first embodiment is detected through machining light and machining sound.

FIG. 7 is a diagram illustrating an example of weighting information according to the first embodiment.

FIG. 10 is a diagram illustrating an example of weighting information according to the second embodiment.

FIG. 13 is a diagram illustrating an example of weighting information according to a fifth embodiment.

DESCRIPTION OF EMBODIMENTS

A machining failure detection device, a laser cutting apparatus, and a spark machining apparatus according to embodiments of the present invention will be hereinafter described in detail with reference to the drawings. The present invention is not limited to the embodiments.

First Embodiment

Figure 1:
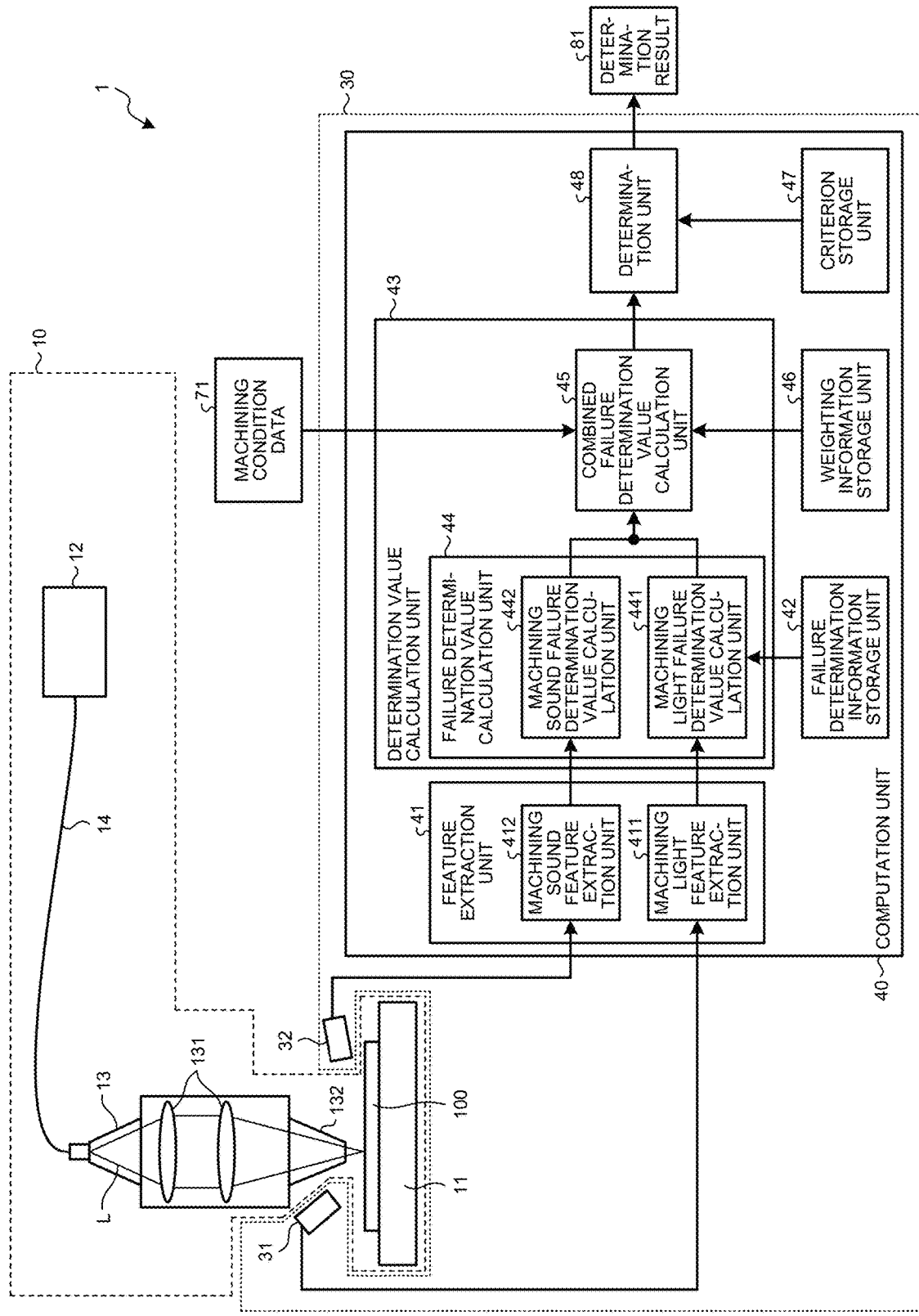
FIG. 1 is a diagram schematically illustrating an exemplary configuration of a laser cutting apparatus according to a first embodiment.

FIG. 1 is a diagram schematically illustrating an exemplary configuration of a laser cutting apparatus according to the first embodiment. The laser cutting apparatus 1 includes a laser cutting unit 10 and a machining failure detection unit 30. The laser cutting unit 10 performs machining by irradiating a workpiece 100 with laser light L. The machining failure detection unit 30 is a machining failure detection device that detects a laser cutting failure in the laser cutting unit 10.

The laser cutting unit 10 includes a stage 11, a laser oscillator 12, a machining head 13, and an optical fiber 14. The stage 11 has the workpiece 100 placed thereon. The laser oscillator 12 outputs the laser light L. The machining head 13 focuses the laser light L from the laser oscillator 12 on the workpiece 100. The optical fiber 14 allows propagation of the laser light L from the laser oscillator 12 to the machining head 13.

The laser oscillator 12 can be of any type. An example of the laser oscillator 12 is a gas laser such as a carbon dioxide laser, or a solid-state laser such as a fiber laser oscillator or an Yttrium Aluminum Garnet (YAG) laser that uses a YAG crystal as an excitation medium. Alternatively, the laser oscillator 12 may be a direct diode laser that uses light from a laser diode as it is.

The machining head 13 includes an optical system 131 and a machining nozzle 132. The optical system 131 focuses the laser light L on the workpiece 100. The machining nozzle 132 supplies machining gas to a machining point at which the workpiece 100 is irradiated with the laser light L during laser cutting. The supply of machining gas from the machining nozzle 132 blows off metal dross melted by the laser light L. An example of machining gas is oxygen or nitrogen. The supply of oxygen gas as machining gas promotes machining through oxidation reactions. The supply of nitrogen gas as machining gas prevents oxidation of the machined surface to thereby improve the quality of the machined surface. Note that the machining nozzle 132 is connected to a machining gas supply unit (not illustrated) to which machining gas is supplied. In addition, when the laser cutting unit 10 performing shape machining, at least one or more drive devices (not illustrated) will be provided to change the relative positional relationship between the machining head 13 and the stage 11.

The machining failure detection unit 30 measures light and sound generated when the laser cutting unit 10 is performing laser cutting on the workpiece 100, and determines whether a failure has occurred in laser cutting on the basis of a result of the measurement. The machining failure detection unit 30 includes a machining light measurement unit 31, a machining sound measurement unit 32, and a computation unit 40.

The machining light measurement unit 31 measures machining light from plasma generated on or around the surface of the workpiece 100 having reached a high temperature during laser cutting, and outputs, to the computation unit 40, a machining light signal in which the measured beams of machining light are arranged in time series. The machining light measurement unit 31 is equipped with an optical sensor or a spectrometer. Examples of the optical sensor include a photodiode, a photoelectron tube, a charge-coupled device (CCD) sensor, and a complementary metal-oxide-semiconductor (CMOS) sensor. An example of the spectrometer is a spectral spectrometer.

Figure 2:
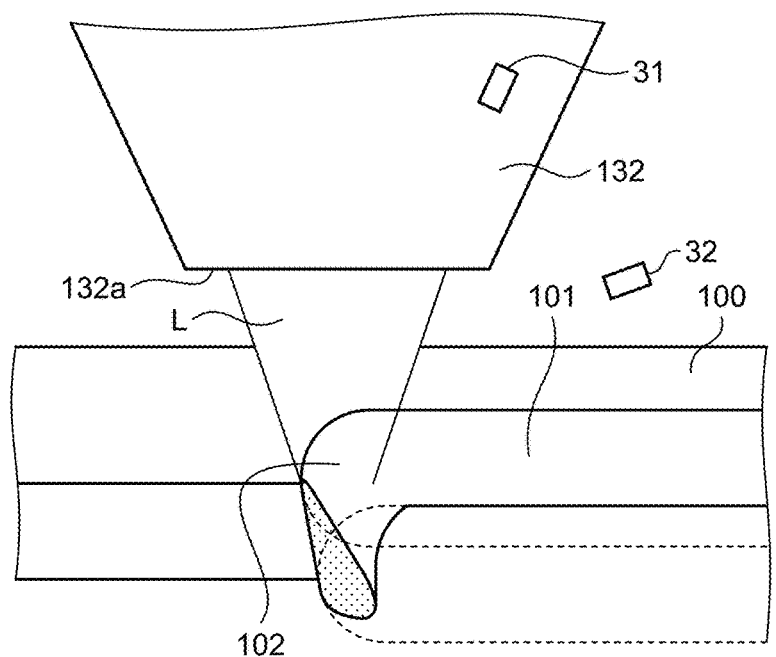
FIG. 2 is a diagram schematically illustrating an area around a machining point under laser cutting according to the first embodiment.

FIG. 2 is a diagram schematically illustrating an area around a machining point under laser cutting according to the first embodiment. The machining light measurement unit 31 may be located in such a manner as to measure machining light generated at the machining point. The machining light measurement unit 31 may be provided outside the machining nozzle 132 as illustrated in FIG. 1, or may be provided inside the machining nozzle 132 as illustrated in FIG. 2. In these cases, the machining light measurement unit 31 is installed on the side from which to irradiate the workpiece 100 with the laser light L. In these cases, alternatively, an optical system including a 50% beam splitter may be used so that machining light from the machining point is guided to the machining light measurement unit 31. A machining failure that occurs in a cut slit 101 or information on a cut front 102 which is a sloping surface irradiated with the laser light L is measured as a change in the signal light intensity of machining light.

Returning to FIG. 1, the machining sound measurement unit 32 measures machining sound generated around the machining point during laser cutting, and outputs, to the computation unit 40, a machining sound signal in which the measured machining sounds are arranged in time series. The machining sound measurement unit 32 is equipped with a machining sound detection sensor. An example of the machining sound detection sensor is a microphone. The machining sound measurement unit 32 is installed near the machining point outside the machining head 13.

Machining sound generated around the machining point is mainly classified into nozzle passage sound, gas dissipation sound, or cut section passage sound. Nozzle passage sound is a sound generated when the flow of machining gas passes through the machining nozzle 132. Gas dissipation sound is a sound generated when the flow of machining gas passes through the gap between the tip of the machining nozzle 132 and the workpiece 100 and is dissipated into the surroundings. Cut section passage sound is a sound generated when the flow of machining gas passes through a narrow gap called the cut slit 101 formed in the workpiece 100 during laser cutting, as illustrated in FIG. 2. The cut slit 101 has varying widths or tapered shapes at machining points thereof depending on the machining situation. For this reason, the shape of the flow path through which machining gas flows changes. Such a change is measured as a change in machining sound, in particular, in cut section passage sound.

Returning to FIG. 1, the computation unit 40 uses the machining light signal from the machining light measurement unit 31 and the machining sound signal from the machining sound measurement unit 32 to determine whether a machining failure occurrence in laser cutting has been detected.

The computation unit 40 includes a feature extraction unit 41, a failure determination information storage unit 42, a determination value calculation unit 43, a weighting information storage unit 46, a criterion storage unit 47, and a determination unit 48.

The feature extraction unit 41 includes a machining light feature extraction unit 411 and a machining sound feature extraction unit 412. The machining light feature extraction unit 411 analyzes the time-series machining light signal obtained from the machining light measurement unit 31, and extracts a machining light feature indicating a characteristic of machining. An example of a machining light feature is an average machining light signal intensity, i.e. the average of the intensities of the time-series machining light signal, or a coefficient of variation of machining light, i.e. the variance of the machining light signal normalized by the average machining light signal intensity.

The machining sound feature extraction unit 412 analyzes the time-series machining sound signal obtained from the machining sound measurement unit 32, and extracts a machining sound feature indicating a characteristic of machining. An example of a machining sound feature is an average machining sound signal intensity, i.e. the average of the intensities of the time-series machining sound signal, or a coefficient of variation of machining sound, i.e. the variance of the machining sound signal normalized by the average machining sound signal intensity.

The failure determination information storage unit 42 stores failure determination information indicating features produced upon occurrence of machining failures. Examples of machining failures desired to be detected in laser cutting are machining failure due to cut section blockage and machining failure in the cut surface. Machining failure due to cut section blockage includes burning or gouging that occurs when metal dross of the workpiece 100 heated and melted by the laser light L blocks the cut slit 101. In addition, machining failure in the cut surface includes flaws or roughness caused by discontinuous dross discharge due to impurities in the workpiece 100 in the cut surface, insufficient intensity, excessive intensity, or instability, of the laser light L, or melting instability of the molten metal surface.

The failure determination information includes associations between types of machining failures and failure determination criteria so that the machining failure due to cut section blockage and the machining failure in the cut surface can be detected. A failure determination criterion is a standard for identifying an extracted feature as a machining failure. An example of the failure determination information is the association between cut section blockage failure and the extracted coefficient of variation of machining light and the extracted coefficient of variation of machining sound at the time of failure due to cut section blockage. Another example of the failure determination information is the association between cut surface failure and the observed coefficient of variation of machining light and the observed coefficient of variation of machining sound at the time of cut surface failure. Although failure due to cut section blockage and failure in the cut surface are described here as examples of types of failures, any other failures may be included that can be detected from machining light and machining sound. Other failures include dross adhesion, i.e. metal dross solidified at the lower end of the cut slit.

The determination value calculation unit 43 calculates a combined failure determination value by weighting the machining light feature and the machining sound feature, as defined in accordance with a machining condition, and combining the weighted features. In the first embodiment, the determination value calculation unit 43 calculates a machining light failure determination value and a machining sound failure determination value, using the machining light feature and the machining sound feature and weights the calculated failure determination values, as defined in accordance with a machining condition, to calculate a combined failure determination value. The determination value calculation unit 43 includes a failure determination value calculation unit 44 and a combined failure determination value calculation unit 45. The failure determination value calculation unit 44 calculates a failure determination value for each of the machining light feature and the machining sound feature. The combined failure determination value calculation unit 45 weights the failure determination value of machining light and the failure determination value of machining sound and calculates a combined failure determination value.

The failure determination value calculation unit 44 includes a machining light failure determination value calculation unit 441 and a machining sound failure determination value calculation unit 442. The machining light failure determination value calculation unit 441 compares the machining light feature extracted by the machining light feature extraction unit 411 with a failure determination criterion in the failure determination information, and calculates a machining light failure determination value indicating the degree of probability of machining failure occurrence. An example of the machining light failure determination value is the degree of matching between the machining light feature and the failure determination criterion for machining light in the failure determination information.

The machining sound failure determination value calculation unit 442 compares the machining sound feature extracted by the machining sound feature extraction unit 412 with a failure determination criterion in the failure determination information, and calculates a machining sound failure determination value indicating the degree of failure occurrence. An example of the machining sound failure determination value is the degree of matching between the machining sound feature and the failure determination criterion for machining sound in the failure determination information.

Note that in a case where the failure determination information includes plural types of machining failures, the machining light failure determination value calculation unit 441 and the machining sound failure determination value calculation unit 442 calculate machining light failure determination values and machining sound failure determination values for all types of machining failures, and individually select the value that is the highest degree of matching. In a case where the selected failure determination values, which are the highest degrees of matching, are less than a threshold, the machining light failure determination value calculation unit 441 and the machining sound failure determination value calculation unit 442 may determine that no failure has occurred. That is, when the degree of matching is less than a certain threshold, it is determined that no failure has occurred, in which case the calculation of a combined failure determination value in the combined failure determination value calculation unit 45 to be described later can be skipped.

A description will be made hereinbelow as to the ease of machining failure determination using machining light during laser cutting will be described. As described above, the machining light measurement unit 31 is located inside the machining head 13 or outside the machining head 13 on the side from which to irradiate the workpiece 100 with the laser light L.

At the time of burning or gouging, which is a machining failure due to cut section blockage, metal dross generated during machining is not discharged downward from the workpiece 100 having the cut slit 101 of FIG. 2 unlike in the case of successful cutting, but remains around the machining point on the surface of the workpiece 100. For this reason, the metal dross remaining around the machining point is irradiated with the laser light L, and thus the molten metal around the machining point on the surface of the workpiece 100 has such a high temperature that strong machining light is generated. This helps the machining light measurement unit 31 to measure machining light with ease, enabling the machining light feature extraction unit 411 to obtain a high light signal intensity of machining light. As a result, the machining light failure determination value calculation unit 441 can easily identify the machining failure due to metal dross, using machining light.

On the other hand, the easiness of determination of flaws or roughness that is a machining failure in the cut surface varies depending on the plate thickness or the portion where the machining failure occurs. In FIG. 2, the laser light L and machining gas are supplied through a machining nozzle outlet 132a of the machining nozzle 132 to the machining point on the workpiece 100. Molten metal melted by the laser light L flows downward by its own weight, surface tension, or machining gas. In the example of FIG. 2, moving the machining head 13 in the left direction relative to the workpiece 100 forms the cut slit 101 between edges on the surface of the workpiece 100. In this manner, cutting is performed.

The cut slit 101 includes the cut front 102 that is a sloping surface irradiated with the laser light L. During cutting, molten metal is present on the surface of the cut front 102. Because low-temperature molten metal has high viscosity and surface tension, such molten metal is not discharged downward in FIG. 2 until the weight of molten metal becomes large enough to overcome the viscosity and surface tension. When the volume of molten metal and the weight of molten metal increase with progress of the melting, the weight of molten metal overcomes the viscosity and surface tension, so that molten metal is discharged downward in FIG. 2. In this case, a large volume of molten metal is discharged at a time, which increases the surface roughness of the cut front 102 to such an extent that flaws, roughness, or the like is likely to occur. On the other hand, high-temperature molten metal has low viscosity, and thus is discharged downward in FIG. 2 even with a lower weight or volume of molten metal for overcoming the viscosity and surface tension. In this case, a small volume of molten metal is discharged at a time, which reduces the surface roughness of the cut front 102 to such an extent that flaws, roughness, or the like is unlikely to occur. Specifically, as a smaller volume of molten metal is discharged at a time, the cut surface has a smaller surface roughness, and the surface roughness, flaws, or roughness of the cut surface depends on the temperature of the cut front 102. Note that the temperature and volume of molten metal in this case depend on the material of the workpiece 100 to be subjected to laser cutting and the machining gas to be used. In particular, the temperature and volume of molten metal depend on the density of molten metal and the viscosity of the material of molten metal with respect to temperature.

In addition, because the cut front 102 vibrates at the natural frequency determined by the viscosity distribution, thickness distribution, or density distribution that depends on the composition, oxidation state, or temperature distribution, of molten metal, the surface shape of molten metal on the cut front 102 changes in accordance with the machining state. The cut front 102 irradiated with the laser light L is hot and thus has a corresponding radiation distribution, and the direction of machining light also changes in accordance with the vibration of the cut front 102. Furthermore, because molten metal or plasma emitted from the cut front 102 is also hot, machining light is generated in the cut slit 101 or substantially above the machining point on the workpiece 100.

Such machining light generated around the machining point has a lot of information on the cut front 102, and measuring this machining light can estimate the machining situation. When the workpiece 100 is thin relative to the cut slit width as illustrated in FIG. 2, the cut front 102 can be observed from the sensor in the machining light measurement unit 31. It is therefore possible to determine with high accuracy the presence of flaws or roughness in the cut slit 101 from machining light.

Figure 3:
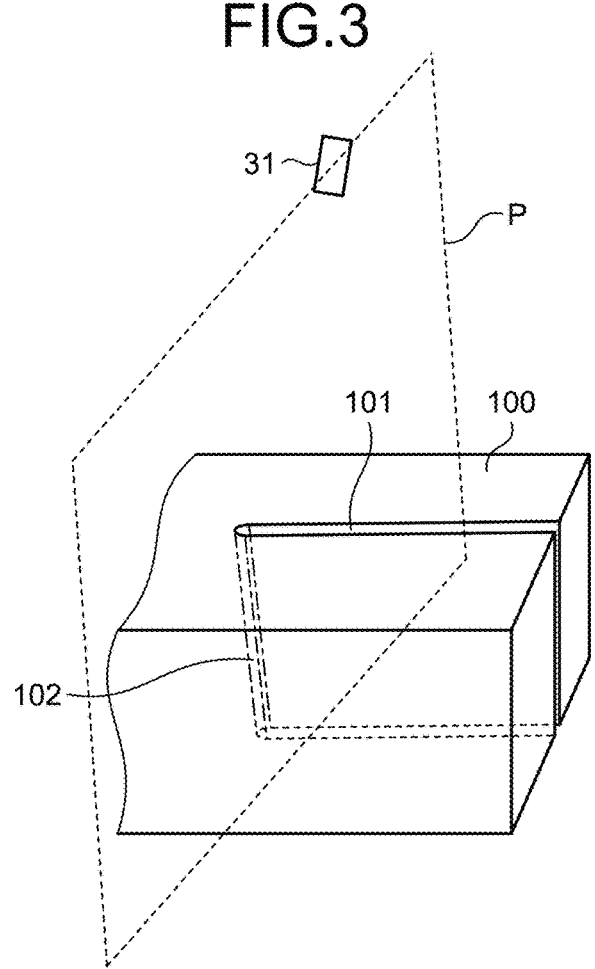
FIG. 3 is a diagram illustrating an exemplary arrangement between a cut slit and a machining light measurement unit according to the first embodiment.

In contrast, the workpiece 100 may be thick relative to the width of the cut slit 101 formed in the workpiece 100, an example of which will be described below. FIG. 3 is a diagram illustrating an exemplary arrangement between a cut slit and a machining light measurement unit according to the first embodiment. As illustrated in FIG. 3, the machining light measurement unit 31 is located at a position at which to observe the machining point. Which thickness is regarded as large relative to the thickness of the workpiece 100 depends on the type of the workpiece 100 or the machining conditions. One example is to regard the workpiece 100 with a thickness of 9 mm or less as thin, the workpiece 100 with a thickness of 19 mm or more as thick, and the range of thickness from 9 mm to 19 mm exclusive as medium thickness. Assuming that the cut slit width is W, the thickness of the workpiece 100 is T, and the ratio of the thickness of the workpiece 100 to the cut slit width is T/W, for example. The workpiece 100 with a T/W of 15 or less is regarded as thin, the workpiece 100 with a T/W of 20 or more is regarded as thick, and the range of T/W from 15 to 20 exclusive is regarded as medium thickness.

FIG. 4 is a diagram illustrating an example in which the cut slit has a certain width as the workpiece and the machining light measurement unit illustrated in FIG. 3 are cut with a plane P passing through the machining light measurement unit and perpendicular to the direction of extension of the cut slit. In a case where the workpiece 100 is thick relative to the width of the cut slit 101, machining light generated on the lower part of the cut slit 101 needs to pass through the thick, narrow cut slit 101 to reach the machining light measurement unit 31 as illustrated in FIG. 4, and thus only a small solid angle can reach the machining light measurement unit 31. That is, only a small intensity of machining light can be measured by the machining light measurement unit 31, which reduces the accuracy of detection.

FIG. 5 is a diagram illustrating an example in which the cut slit has a certain width as the workpiece and the machining light measurement unit illustrated in FIG. 3 are cut with the plane P passing through the machining light measurement unit and perpendicular to the direction of extension of the cut slit. In the case where the cut slit 101 has a constricted shape at the intermediate part in the thickness direction of the workpiece 100, as illustrated in FIG. 5, machining light generated below the intermediate part of the cut slit 101 cannot linearly reach the machining light measurement unit 31. It is therefore more difficult to detect, from machining light, a machining failure generated at a position below the constricted shape.

Thus, in the case where the machining light measurement unit 31 measures machining light generated by a machining failure in the cut slit 101, machining light generated by a machining failure in the upper part of the cut slit 101 is easier to measure than machining light generated by a machining failure in the lower part. Accordingly, compared with the accuracy of detection of flaws or roughness generated in the upper part of the cut slit 101, the accuracy of detection of flaws or roughness generated in the lower part is relatively low. However, even in the lower part of the cut slit 101, flaws or roughness large enough to close the gap can produce detectable machining light, which increases the accuracy of detection.

Next, a description will be made as to the ease of determination of machining failure using machining sound during laser cutting, focusing on nozzle passage sound, gas dissipation sound, or cut section passage sound, as described above. The width or shape of the cut slit 101 changes depending upon the machining situation, such that the shape of the flow path through which machining gas flows changes, and such a change is measured by the machining sound measurement unit 32 as changes in machining sound.

At the time of burning or gouging, which is a machining failure due to cut section blockage, the cut slit 101 is blocked with molten metal, so that the flow of machining gas to the cut slit 101 stops completely. Thus, cut section passage sound is not observed after the occurrence of burning or gouging. As such, changes in machining sound associated with the occurrence of burning or gouging are so marked as to facilitate determination of machining failure from machining sound.

The easiness of determination of flaws or roughness that is a machining failure in the cut surface varies depending on the plate thickness or the portion where the machining failure occurs. In a case where the workpiece 100 is thick relative to the cut slit width as illustrated in FIG. 3, the interaction distance between the machining gas and the machined surface generated by laser cutting is so long as to increase the intensity of the machining sound signal. For this reason, when a machining failure such as flaws or roughness occurs at the lower part of the cut slit 101, the situation of machining gas flow in the entire cut slit 101 changes. As a result, it is possible to measure the machining failure generated on the cut surface as a large change in machining sound.

Conversely, in a case where the workpiece 100 is thin relative to the width of the cut slit 101 as illustrated in FIG. 2, the interaction distance between the machining gas and the machined surface is short. As a result, only a slight change occurs in the machining sound signal, and the accuracy of detection of the machining failure generated on the cut surface is relatively low.

FIG. 6 is a diagram illustrating an example of the relative accuracy with which each type of failure in laser cutting of the first embodiment is detected through machining light and machining sound. This drawing summarizes the above description. In the case of machining failure due to cut section blockage, the failure can be detected with high accuracy through either machining light or machining sound. In the case of machining failure in the cut surface of the workpiece 100 thick relative to the cut slit width, the accuracy of detection of the machining failure through machining light is low, whereas the failure can be detected with high accuracy through machining sound. It should be noted that the using machining light from the upper part of the cut slit 101 enables detecting the failure with high accuracy, but the use of machining light from the lower part degrades the accuracy of failure detection. When the workpiece 100 is thin relative to the cut slit width, the failure can be detected with high accuracy through machining light, whereas the accuracy of detecting the machining failure through machining sound is low.

Returning to FIG. 1, the combined failure determination value calculation unit 45 calculates a combined failure determination value, using a machining light failure determination value, a machining sound failure determination value, and weights. At this time, the combined failure determination value calculation unit 45 acquires weights associated with machining condition data 71, from weighting information in the weighting information storage unit 46. Weighting information will be described later. The combined failure determination value is obtained by multiplying each of the machining light failure determination value and the machining sound failure determination value by a weight and adding the weighted values to each other.

The weighting information storage unit 46 stores weighting information that defines weights for the machining light failure determination value and the machining sound failure determination value in association with machining conditions for laser cutting of the workpiece 100. FIG. 7 is a diagram illustrating an example of weighting information according to the first embodiment. In this example, the plate thickness of the workpiece 100 is shown as a machining condition. The plate thickness may be an absolute thickness, or a relative thickness, i.e. the ratio of the plate thickness of the workpiece 100 to the cut slit width. Then, weights for the machining light failure determination value and the machining sound failure determination value are defined for each range of plate thicknesses.

As described above, in machining failure determination through machining light measurement or machining failure determination through machining sound measurement, the accuracy of detection can be high or low, depending on the machining conditions such as the thickness of the workpiece 100 or the situation of machining failure occurrence. In other words, the accuracy of detection through machining light and the accuracy of detection through machining sound are not constant, but can vary depending on the machining conditions. In some cases, thus, machining failure determination through machining light measurement alone or machining failure determination through machining sound measurement alone fails to secure sufficient accuracy.

In addition, as illustrated in FIG. 6, in the case where a machining failure in the cut surface is detected from the workpiece 100 that is thick relative to the width of the cut slit 101, the accuracy of detection through machining light measurement is low, whereas the accuracy of detection through machining sound measurement is high. Conversely, for the workpiece 100 that is thin relative to the width of the cut slit 101, the opposite behavior is exhibited: the accuracy of detection through machining light measurement is high, whereas the accuracy of detection through machining sound measurement is low.

In view of this, the present embodiment provides a lower weight for the machining sound failure determination value and a higher weight for the machining light failure determination value, in the case of the workpiece 100 having a small plate thickness, i.e. a plate thickness less than xx [cm] in the example of FIG. 7, given that determination by the machining sound failure determination value calculation unit 442 fails to ensure high accuracy of machining failure detection. With the weights thus provided, a highly accurate detection result can be obtained regarding the occurrence of machining failure.

In the case of the workpiece 100 having a large plate thickness, i.e. a plate thickness of xx [cm] or more in the example of FIG. 7, the machining light failure determination value derived from a machining failure generated in the upper part of the cut slit 101 ensures high accuracy of machining failure determination, whereas the machining light failure determination value derived from a machining failure in the lower part of the cut slit 101 degrades the accuracy of detection. On the other hand, the use of the machining sound failure determination result ensures accurate determination of failure occurrence, regardless of the position of the machining failure. In such a case, therefore, a lower weight is provided for the machining light failure determination value and a higher weight is provided for the machining sound failure determination value. As a result, a highly accurate detection result can be obtained regarding the occurrence of machining failure. As described above, in the first embodiment, different weights are determined in advance for each machining condition, taking account of a difference between the accuracy of detection of the probability of machining failure occurrence through the use of the machining light failure determination value and the accuracy of detection of the probability of machining failure occurrence through the use of the machining sound failure determination value.

Note that such weighting also ensures high accuracy in detecting machining failure due to cut section blockage although the machining failure due to cut section blockage is detected with high accuracy through either machining light measurement or machining sound measurement. In other words, such weighting does not degrade the accuracy of detection of machining failure due to cut section blockage. As a result, the weights defined in accordance with the accuracy of detection of machining failure in the cut surface are applied to the entire machining condition.

The example of FIG. 7 shows that the machining condition is the plate thickness of the workpiece 100, and the machining light failure determination value and the machining sound failure determination value vary depending on the plate thickness. Besides this, the detection accuracy of the machining light failure determination value and the machining sound failure determination value may vary depending on the material and surface state of the workpiece 100, the output of the laser light L, the machining gas pressure, and the feeding speed.

For example, the machining light failure determination result achieves high accuracy of detection that is not greatly affected by changes in machining gas pressure, whereas the machining sound failure determination result in the case of high machining gas pressure can be low, as compared with the case of low machining gas pressure. As another example, the machining sound failure determination result achieves high accuracy of detection that is not greatly affected by changes in feeding speed, whereas the machining light failure determination result can be low in the case of high feeding speed, as compared with the case of low feeding speed. Weights may be therefore determined on a per machining-failure basis for a combination of machining conditions including the material, plate thickness, and surface state of the workpiece 100, the output of the laser light L, the machining gas pressure, and the feeding speed. Other machining conditions such as the condensing diameter of the laser light L, the position of the condensing point relative to the surface of the workpiece 100, the shape of the machining nozzle 132, and the distance between the machining nozzle 132 and the workpiece 100 may be taken into consideration for determining weights for each machining failure.

Returning to FIG. 1, the criterion storage unit 47 stores a criterion for determining whether a failure has occurred in laser cutting, using a combined failure determination value. This example is based on the assumption that the criterion represents the range of combined failure determination values indicating occurrence of failure in laser cutting. The criterion is determined using experimentally acquired, combined failure determination values during successful laser cutting and experimentally acquired, combined failure determination values during laser cutting involving machining failure.

The determination unit 48 compares the combined failure determination value with the criterion, and determines whether a machining failure has occurred during the laser cutting. That is, the determination unit 48 determines that a failure has occurred when the combined failure determination value is within the range of the criterion indicating failure occurrence, and determines that no failure has occurred when the combined failure determination value is out of the range of the criterion. Then, the determination unit 48 outputs a determination result 81. For example, the determination unit 48 outputs the determination result 81 to a control unit that controls the laser cutting unit 10. When receiving the determination that a failure has occurred, the control unit for the laser cutting unit 10 temporarily stops the laser cutting.

As described above, changing the weights for the machining light failure determination value and the machining sound failure determination value according to the machining conditions enables the determination unit 48 to stably detect machining failures with high accuracy.

Figure 8:
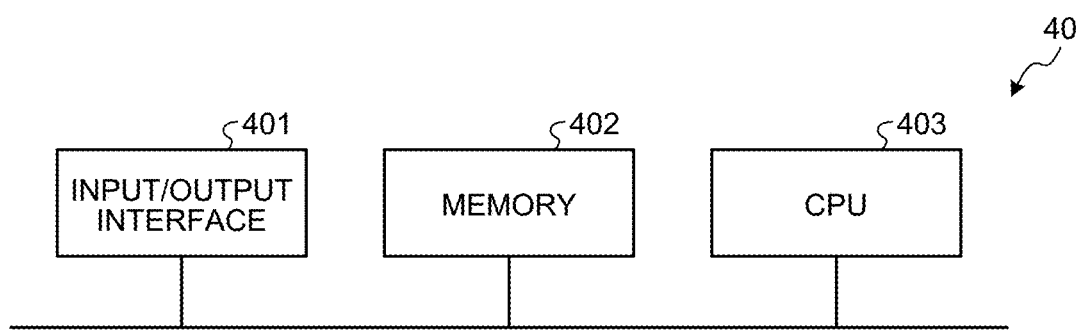
FIG. 8 is a diagram illustrating an exemplary hardware configuration of a computation unit according to the first embodiment.

Here, the hardware configuration of the computation unit 40 will be described. FIG. 8 is a diagram illustrating an exemplary hardware configuration of the computation unit according to the first embodiment. The computation unit 40 includes an input/output interface 401, a memory 402, and a central processing unit (CPU) 403.

The input/output interface 401 receives input of signals from the machining light measurement unit 31 and the machining sound measurement unit 32, and provides output to the laser cutting unit 10 when the determination unit 48 determines that a machining failure has occurred in laser cutting.

The memory 402 stores software, firmware, or a combination of software and firmware as a program. The memory 402 contains a program for determining whether a failure has occurred during laser cutting. The memory 402 also stores signals that are measurement results in the machining light measurement unit 31 and the machining sound measurement unit 32. The memory 402 further stores the machining condition data, failure determination information, weighting information, and criterion. The memory 402 is configured by a non-volatile or volatile semiconductor memory, a magnetic disk, an optical disk, or a magneto-optical disk. A non-volatile or volatile semiconductor memory can be a random access memory (RAM), a read only memory (ROM), a flash memory, an erasable programmable ROM (EPROM), or an electrically EPROM (EEPROM, registered trademark). The functions of the failure determination information storage unit 42, the weighting information storage unit 46, and the criterion storage unit 47 are implemented by the memory 402.

The CPU 403 executes a program stored in the memory 402 using the measurement results, machining condition data, failure determination information, weighting information, and criterion stored in the memory 402 to identify a machining failure in the laser cutting being executed by the laser cutting unit 10. The functions of the feature extraction unit 41, the determination value calculation unit 43, and the determination unit 48 are implemented by the CPU 403.

Next, the operation of the laser cutting apparatus 1 including the machining failure detection unit 30 configured as above will be described with reference to FIG. 1. The laser cutting unit 10 performs laser cutting on the workpiece 100 in accordance with preset machining conditions. During the laser cutting, machining light generated at the machining point is measured by the machining light measurement unit 31, and machining sound generated at the machining point is measured by the machining sound measurement unit 32. The machining conditions of the laser cutting unit 10 are input to the machining failure detection unit 30 as the machining condition data 71.

The machining light signal that is the result of measurement by the machining light measurement unit 31 is passed to the machining light feature extraction unit 411, and the machining light feature extraction unit 411 extracts a feature from the machining light signal. The machining light failure determination value calculation unit 441 calculates a machining light failure determination value, using the extracted feature and the failure determination information in the failure determination information storage unit 42. The machining light failure determination value calculation unit 441 outputs the machining light failure determination value to the combined failure determination value calculation unit 45.

The machining sound signal that is the result of measurement by the machining sound measurement unit 32 is passed to the machining sound feature extraction unit 412, and the machining sound feature extraction unit 412 extracts a feature from the machining sound signal. The machining sound failure determination value calculation unit 442 calculates a machining sound failure determination value, using the extracted feature and the failure determination information in the failure determination information storage unit 42. The machining sound failure determination value calculation unit 442 outputs the machining sound failure determination value to the combined failure determination value calculation unit 45.

The combined failure determination value calculation unit 45 acquires, from the weighting information storage unit 46, weights corresponding to the machining condition data 71. Then, the combined failure determination value calculation unit 45 calculates a combined failure determination value by multiplying the machining light failure determination value and the machining sound failure determination value by the corresponding weighting coefficients and thereafter adding the weighted values to each other, and outputs the combined failure determination value to the determination unit 48.

After that, the determination unit 48 determines whether the combined failure determination value is within the range of the criterion in the criterion storage unit 47 indicating machining failure occurrence, and outputs the determination result 81. When the combined failure determination value is within the range of the criterion, the determination unit 48 determines that a machining failure has occurred during the laser cutting. When the combined failure determination value is not within the range of the criterion, the determination unit 48 determines that no failure has occurred during the laser cutting.

In the above-described case, the thickness of the workpiece 100 is used as a machining condition, and different weights are provided for the workpiece 100 that is thin and the workpiece 100 that is thick. Alternatively, depending on the thickness of the workpiece 100, different weights may be provided and the machining light measurement unit 31 and the machining sound measurement unit 32 may be selectively used. Specifically, machining failure determination may be performed as follows. For a workpiece with a medium thickness, a combined failure determination value is calculated using weights for the machining failure determination values obtained from the measurement results in the machining light measurement unit 31 and the machining sound measurement unit 32. For a thick plate, only the machining sound failure determination value obtained from the result of measurement by the machining sound measurement unit 32 is used. For a thin plate, only the machining light failure determination value obtained from the measurement result in the machining light measurement unit 31 is used. This corresponds to setting the weights to an extreme value, i.e., one or zero in accordance with the plate thickness as a machining condition in adding the machining sound failure determination value derived from machining sound and the machining light failure determination value derived from machining light. In the case of any thickness other than medium thickness, determination processing only requires either a signal from the machining light measurement unit 31 or a signal from the machining sound measurement unit 32, which reduces the load of calculation processing for machining failure determination and shortens the time required for determination.

In the first embodiment, a combined determination value is calculated by weighting, as defined in accordance with the machining conditions, each of the machining light failure determination result calculated from the feature of machining light and the machining sound failure determination result calculated from the feature of machining sound, and adding the weighted results to each other. Then, when the combined determination value is within the range of the criterion indicating machining failure occurrence, it is determined that a machining failure has occurred in laser cutting. Thus, in accordance with the machining conditions such as the material, thickness, and surface state of the workpiece 100, the laser output, and the feeding speed, the weight for the determination result from the sensor having high detection accuracy is increased and the weight for the determination result from the sensor having low detection accuracy is reduced. As a result, it is possible to improve the accuracy of failure detection in laser cutting. This achieves the effect that a machining failure can be detected even in the case where features indicating machining characteristics of laser cutting have varying proper values depending on the machining conditions.

Second Embodiment

In the first embodiment, a combined determination value is calculated by weighting, as defined in accordance with the machining conditions, each of the machining light failure determination result calculated from the feature of machining light and the machining sound failure determination result calculated from the feature of machining sound, and adding the weighted results to each other. The second embodiment will be described giving a case where weighting is performed in accordance with the machining conditions and the type of machining failure.

Figure 9:
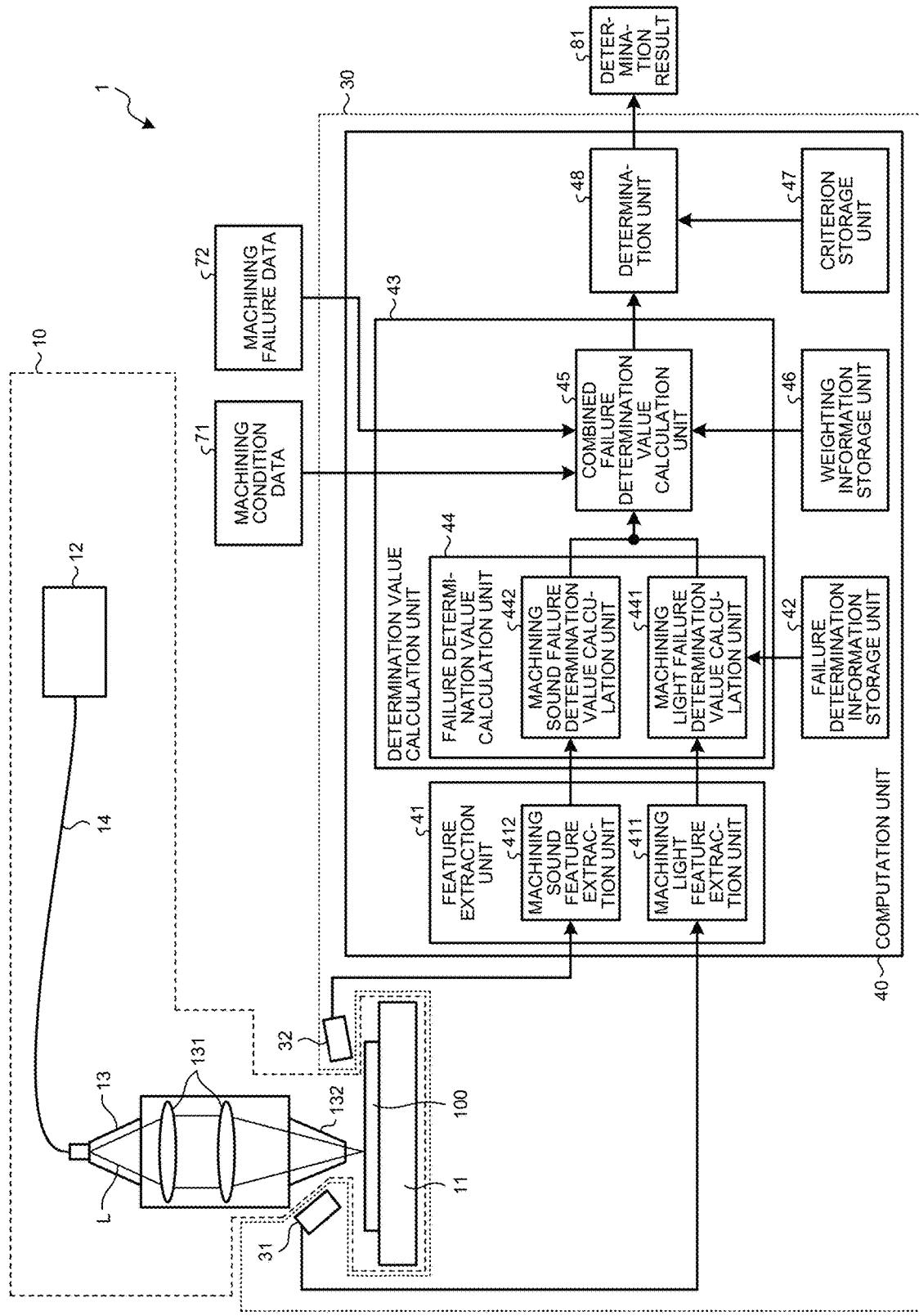
FIG. 9 is a diagram schematically illustrating an exemplary configuration of a laser cutting apparatus according to a second embodiment.

FIG. 9 is a diagram schematically illustrating an exemplary configuration of a laser cutting apparatus according to the second embodiment. In the second embodiment, in addition to the machining condition data 71, machining failure data 72 indicating the type of machining failure is input to the combined failure determination value calculation unit 45.

The weighting information storage unit 46 stores weighting information in which weights are set for combinations of machining condition and type of machining failure. FIG. 10 is a diagram illustrating an example of weighting information according to the second embodiment. In the weighting information, weights are set for combinations of machining condition and type of machining failure. In this example, the plate thickness of the workpiece 100 is used as a machining condition. The types of machining failures include a first classification in which the types of machining failures are roughly classified, and a second classification in which the types of machining failures in the first classification are more finely classified. The first classification includes machining failure due to cut section blockage and machining failure in the cut surface. In addition, as illustrated in FIG. 6, in the case of machining failure in the cut surface of a thick plate, the accuracy of detection through machining light varies depending on the place where the machining failure occurs. For a combination of machining failure in the cut surface and a plate thickness as a machining condition larger than xx [cm] in the example of FIG. 10, therefore, the second classification is divided into upper and lower parts so that weights are finely set.

In the case of a combination of either "plate thickness>xx [cm]" or "plate thickness<xx [cm]" and machining failure due to cut section blockage, the machining failure can be detected with high accuracy through either machining light or machining sound as described above, and thus equivalent weights are assigned.

In the case of a combination of "plate thickness<xx [cm]" and machining failure in the cut surface, the accuracy of machining failure detection through machining sound is relatively low compared with the accuracy of machining failure detection through machining light as described above, and thus machining light is assigned a higher weight.

In the case of a combination of "plate thickness>xx [cm]" and machining failure in the cut surface, flaws or roughness at the upper part of the cut slit 101 can be detected with the machining light failure determination value calculation unit 441 and the machining sound failure determination value calculation unit 442, and thus equivalent weights are assigned.

In the case of a combination of "plate thickness>xx [cm]" and machining failure in the cut surface, the machining light failure determination value calculation unit 441 has low accuracy of detection of flaws or roughness at the lower part of the cut slit 101 and thus is assigned a lower weight. In contrast, the machining sound failure determination value calculation unit 442 has high accuracy of detection of flaws or roughness at the lower part of the cut slit 101 and thus is assigned a higher weight. As a result, the accuracy of detection with the combined failure determination value can be improved.

The accuracy of detection of a small flaw on the cut surface through machining sound is low because the change in the cut front shape is slight and the occurrence of the flaw results in such a small change in the cross-sectional area of flow path within the cut slit that the machining sound only slightly changes. In contrast, the small flow on the cut surface can be detected through machining light with high accuracy because the cut front is instantaneously directed toward the machining light measurement unit 31.

Returning to FIG. 9, when calculating a combined failure determination value, the combined failure determination value calculation unit 45 acquires, from the weighting information, weights corresponding to the combination of the machining condition data 71 and the machining failure data 72. The combined failure determination value calculation unit 45 then calculates a combined failure determination value, using the machining light failure determination value, the machining sound failure determination value, and the weights.

Note that the other configurations are the same as those of the first embodiment, and thus the description thereof will be omitted. In addition, processing in the computation unit 40 is also similar to that described in the first embodiment, and thus the description thereof will be omitted.

In the second embodiment, weights for the machining light failure determination value and the machining sound failure determination value are set in accordance with the combination of machining condition and machining failure. Then, the combined failure determination value calculation unit 45 outputs a combined failure determination value that suits the individual machining failure. This achieves the effect that the situation of machining failure can be determined in more detail, so that the machining conditions can be adjusted with higher accuracy.

In addition, the status of the time-series signals to be measured changes in accordance with the machining failure to be detected. In view of this, the weights for the features of the time-series signals or the weights for the failure determination values are changed in accordance with according to the machining failure to be detected, thereby making it possible to improve the accuracy of detection of the corresponding machining failure individually.

Third Embodiment

In the first and second embodiments, a feature is extracted from the time-series machining light signal so that the machining light failure determination value is calculated from the feature while another feature is similarly extracted from the time-series machining sound signal so that the machining sound failure determination value is calculated from the feature, and the combined failure determination value is calculated weighting the two failure determination values in accordance with the machining conditions or to the type of machining failure and the machining conditions. The third embodiment will be described giving a case where a combined feature is extracted both from the machining light feature extracted from the machining light signal and from the machining sound feature extracted from the machining sound signal. Such a combined feature is defined for the machining conditions or for the type of machining failure and the machining conditions, and the combined failure determination value is calculated using the combined feature.

Figure 11:
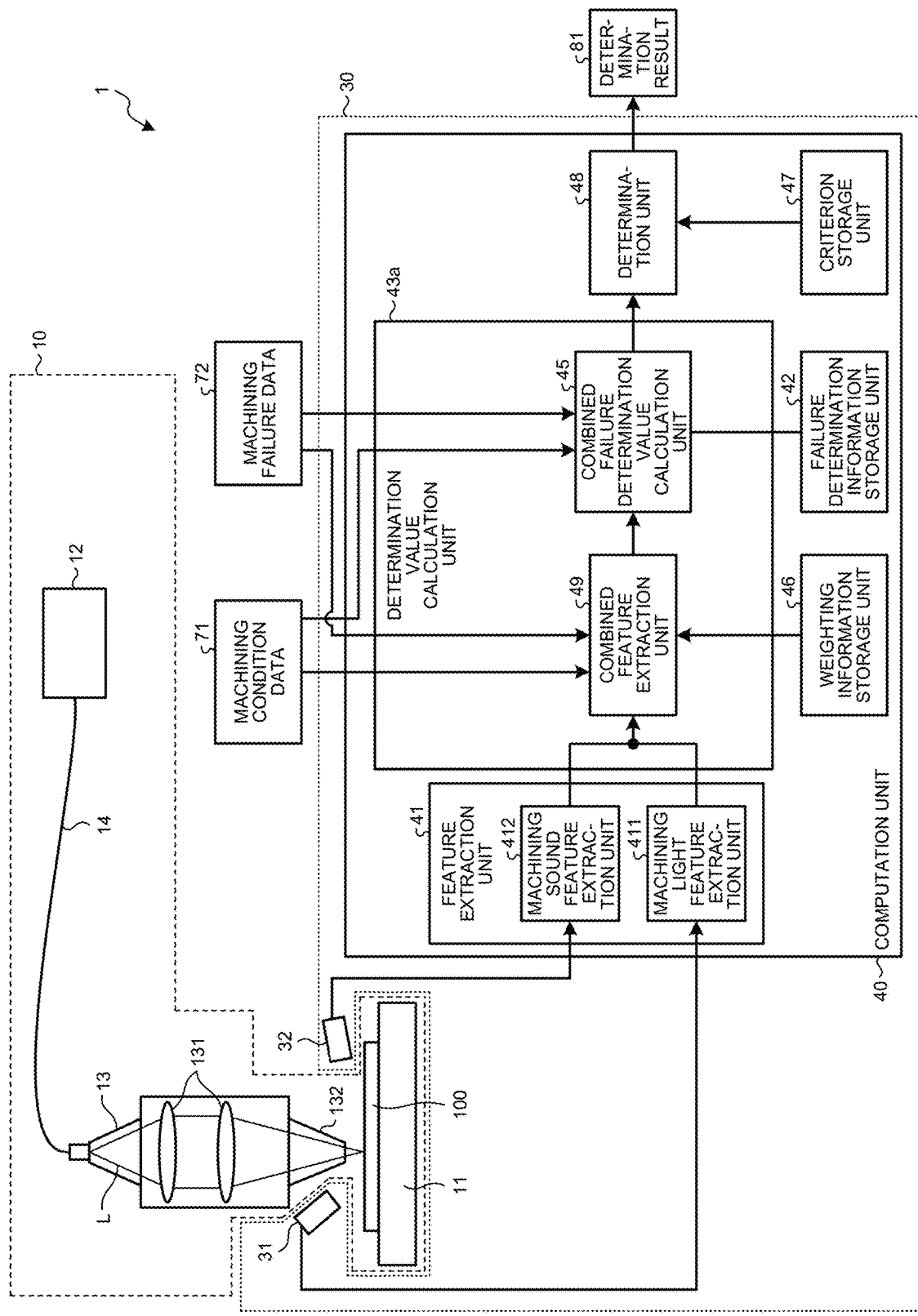
FIG. 11 is a diagram schematically illustrating an exemplary configuration of a laser cutting apparatus according to a third embodiment.

FIG. 11 is a diagram schematically illustrating an exemplary configuration of a laser cutting apparatus according to the third embodiment. The third embodiment is different from the first and second embodiments in the configuration of a determination value calculation unit 43*a*. The determination value calculation unit 43*a* includes a combined feature extraction unit 49 and the combined failure determination value calculation unit 45.

The combined feature extraction unit 49 extracts a combined feature by performing computation processing on the machining light feature extracted by the machining light feature extraction unit 411 and the machining sound feature extracted by the machining sound feature extraction unit 412. The computation processing is defined for the machining condition data 71 or for the machining failure data 72 and the machining condition data 71. The computation processing is, for example, a weighted sum, product, or ratio of the machining light feature and the machining sound feature. An example of the combined feature is a function of two variables: the coefficient of variation of machining light; and the coefficient of variation of machining sound. The function of these two variables can be the sum or maximum value of the two variables weighted in accordance with the machining conditions or to the type of machining failure and the machining conditions, as described in the first and second embodiments. Because the status of vibration of the cut front 102 or the like can be evaluated with high accuracy from such variations in the combined feature, machining failure determination can also be performed with high accuracy. Although the above example indicates a combined feature that is a combination of machining light feature and machining sound feature, the embodiment is not limited thereto. A combined feature may be a combination of different machining light features or a combination of different machining sound features. In this case, the machining light feature extraction unit 411 extracts m (m is a natural number) types of machining light features, and the machining sound feature extraction unit 412 extracts n (n is a natural number) types of machining sound features. It is noted that at least one of m and n should be a natural number of two or more. Then, the combined feature extraction unit 49 obtains a combined feature by performing computation processing as defined for the machining condition data 71 or for the machining failure data 72 and the machining condition data 71, using the m types of machining light features and the n types of machining sound features. Note that the combined feature extraction unit 49 can consult the weighting information in the weighting information storage unit 46.

The failure determination information stored in the failure determination information storage unit 42 indicates the range of combined features indicative of occurrence of machining failure, and defines combined features serving as failure determination criteria for combinations of machining condition and type of machining failure.

The combined failure determination value calculation unit 45 performs combined machining failure determination, using the combined feature. Specifically, The combined failure determination value calculation unit 45 compares the combined feature with the failure criterion corresponding to the combination of the machining condition data 71 and the machining failure data 72 in the failure determination information storage unit 42, and calculates a combined failure determination value indicating the degree of failure occurrence.

Note that the other configurations are the same as those of the first embodiment, and thus the description thereof will be omitted. In addition, processing in the computation unit 40 is also similar to that described in the first embodiment, and thus the description thereof will be omitted.

In the third embodiment, a combined feature is calculated taking into consideration both the machining light feature and the machining sound feature, and a machining failure in laser cutting is identified using the combined feature. As a result, it is possible to further increase the degree of freedom of the feature space as compared with the cases of the first and second embodiments taking into consideration the features from the machining light measurement unit 31 and the machining sound measurement unit 32. That is, it is possible to further increase the degree of freedom in selecting a feature suitable for machining failure determination. As a result, it is possible to further improve the accuracy of machining failure detection in laser cutting.

Fourth Embodiment

In the first to third embodiments, the weights preset for the machining conditions or the type of machining failure desired to be detected are used for the failure determination value calculated from each feature or each feature in calculating the combined failure determination value. The allowable level of machining failure varies depending on the user who uses the laser cutting apparatus or on the application purpose of the workpiece cut by laser cutting. In some case, the machining failure determination result obtained with the preset weights may be so stringent that a user, who adjusts the machining conditions on the basis of this stringent machining failure determination result, cannot set the user's desired machining speed. Conversely, the machining failure determination result obtained with the preset weights may be so lax that a specific user cannot achieve satisfactory cutting surface quality. That is, different thresholds of machining failure are required for different users or different machining applications. In view of this, the fourth embodiment gives a laser cutting apparatus capable of applying different thresholds of machining failure, that is, weights, to different users or different machining applications.

Figure 12:
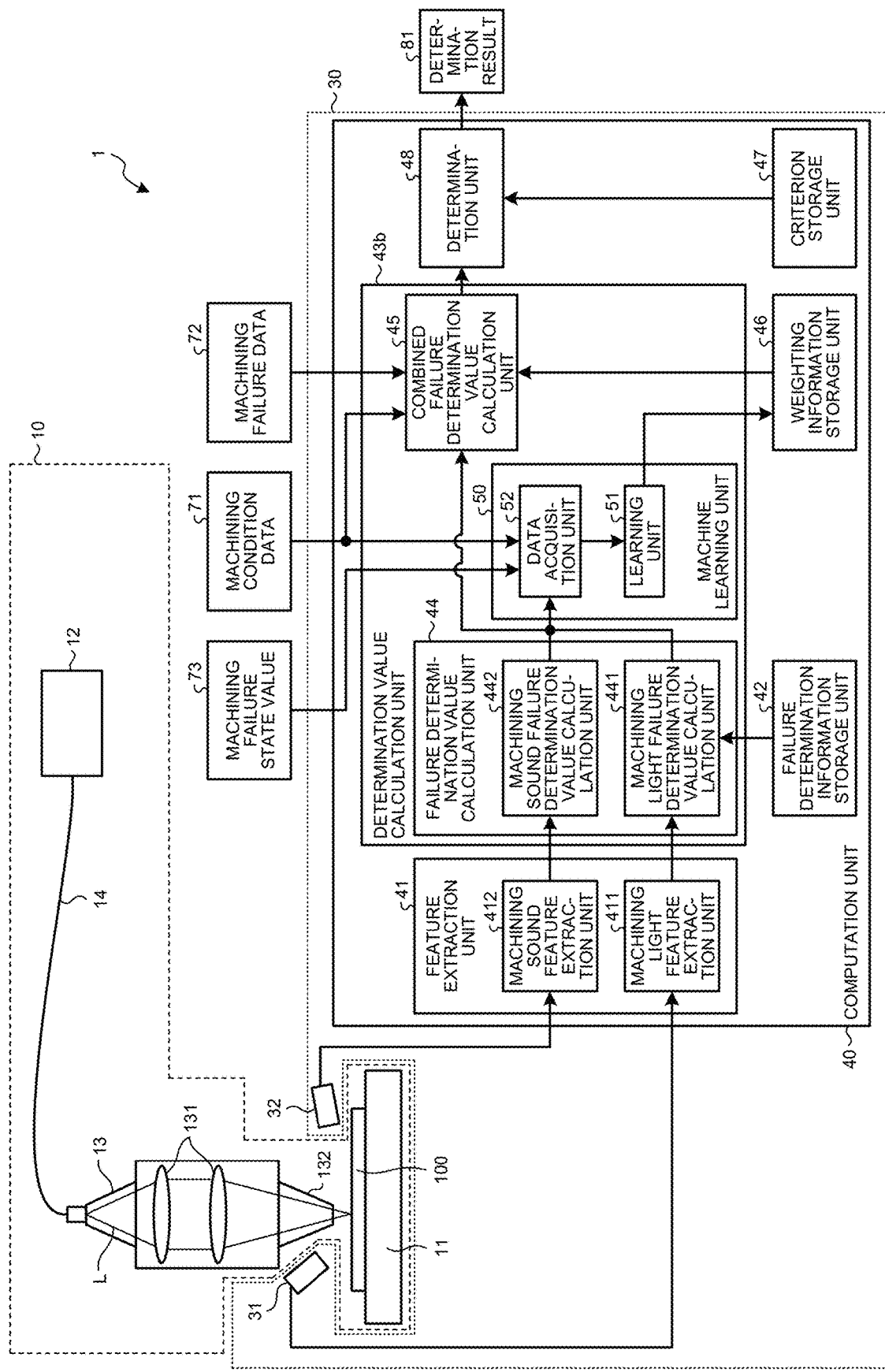
FIG. 12 is a diagram schematically illustrating an exemplary configuration of a laser cutting apparatus according to a fourth embodiment.

FIG. 12 is a diagram schematically illustrating an exemplary configuration of the laser cutting apparatus according to the fourth embodiment. The fourth embodiment is different from the first and second embodiments in the configuration of a determination value calculation unit 43*b*. The determination value calculation unit 43*b* includes a machine learning unit 50.

The machine learning unit 50 includes a learning unit 51 and a data acquisition unit 52. The learning unit 51 learns a set of input and result data through machine learning. The learning unit 51 may use any machine learning algorithm, but can use a supervised learning algorithm, for example. The data acquisition unit 52 inputs, to the learning unit 51, the machining light failure determination value from the machining light failure determination value calculation unit 441, the machining sound failure determination value from the machining sound failure determination value calculation unit 442, the machining condition data 71, and a machining failure state value 73. The machining failure state value 73 is an evaluation value obtained by assessing the machining result of laser cutting performed by the user.

Providing the leaning unit 51 with the above-described inputs as training data allows the learning unit 51 to learn weights. This produces weights that yield a better match with the machining failure determination result desired by the user. The weights produced in this manner are stored in the weighting information storage unit 46.

A possible way of providing training data is to prepare in advance a necessary number of pieces of time-series data on machining light and machining sound and the status of quality of the cut surface of the workpiece 100, and allow the user to select user's desired thresholds of machining failure for use as training data. Alternatively, the user may practically perform machining, and meanwhile provide each machining result with the user evaluation of the machining failure state value 73 regarding the cut surface quality for the purpose of learning by the leaning unit 51.

Note that the other configurations are the same as those of the first and second embodiments, and thus the description thereof will be omitted. In addition, the process of determining the occurrence of machining failure in the computation unit 40 is also similar to that described in the first embodiment, and thus the description thereof will be omitted.

In the fourth embodiment, the machine learning unit 50 learns weights, using the machining light failure determination value, the machining sound failure determination value, the machining condition data 71, and the machining failure state value 73. This achieves the effect that thresholds of machining failure can be selected for each user or each machining application.

Fifth Embodiment

In the fourth embodiment, thresholds of machining failure can be selected on a user-by-user basis or in correspondence to each purpose of machining. The fifth embodiment will be described giving a case where weights are prepared for each combination of machining condition and type of machining failure in association with each prioritized item in laser cutting.

The configuration of the laser cutting apparatus 1 according to the fifth embodiment can be any of the configurations described in the first to fourth embodiments. In the fifth embodiment, however, the weighting information stored in the weighting information storage unit 46 defines weights for each machining condition or for each type of machining failure and each machining condition on a priority-by-priority basis.

FIG. 13 is a diagram illustrating an example of weighting information according to the fifth embodiment. FIG. 13 includes the item "priority" in addition to the items in FIG. 10. Priority indicates opposing options related to laser cutting. An example of opposing options is speed versus machining quality. As illustrated in FIG. 13, weights are set for each combination of priority, machining condition, and type of machining failure. This enables the user to perform machining failure detection in accordance with his/her desired priority at the time of machining. For example, when it is desired to place a higher priority on the speed than on the machining quality in a case where machining conditions and a type of machining failure are predetermined, the corresponding weights from the weighting information are set in the machining failure detection unit 30.

Although FIG. 13 illustrates an example of two options: speed versus machining quality, an intermediate level may be provided between these two items so as to allow selection according to the machining application. This makes it possible to easily select the fastest cutting while satisfying the allowable machining quality level that varies depending upon the machining purpose. In addition, the number of priority options may be three, including machining stability or the like in addition to the above-described two items, or a larger number of items may be provided.

In the fifth embodiment, the weighting information storage unit 46 stores weighting information in which weights are set for each combination of priority, machining condition, and type of machining failure. Then, machining failure determination is performed using the weights determined for the combination of the machining condition and the type of machining failure and the item on which the user desires to place a higher priority. This achieves the effect that machining failure determination can be performed as defined by the user or for the purpose of machining.

Sixth Embodiment

The first to fifth embodiments pertain to a machining apparatus that is a laser cutting apparatus. The sixth embodiment will be described giving a case where the machining failure detection device is applied to a machining apparatus that is a wire spark machining apparatus.

Figure 14:
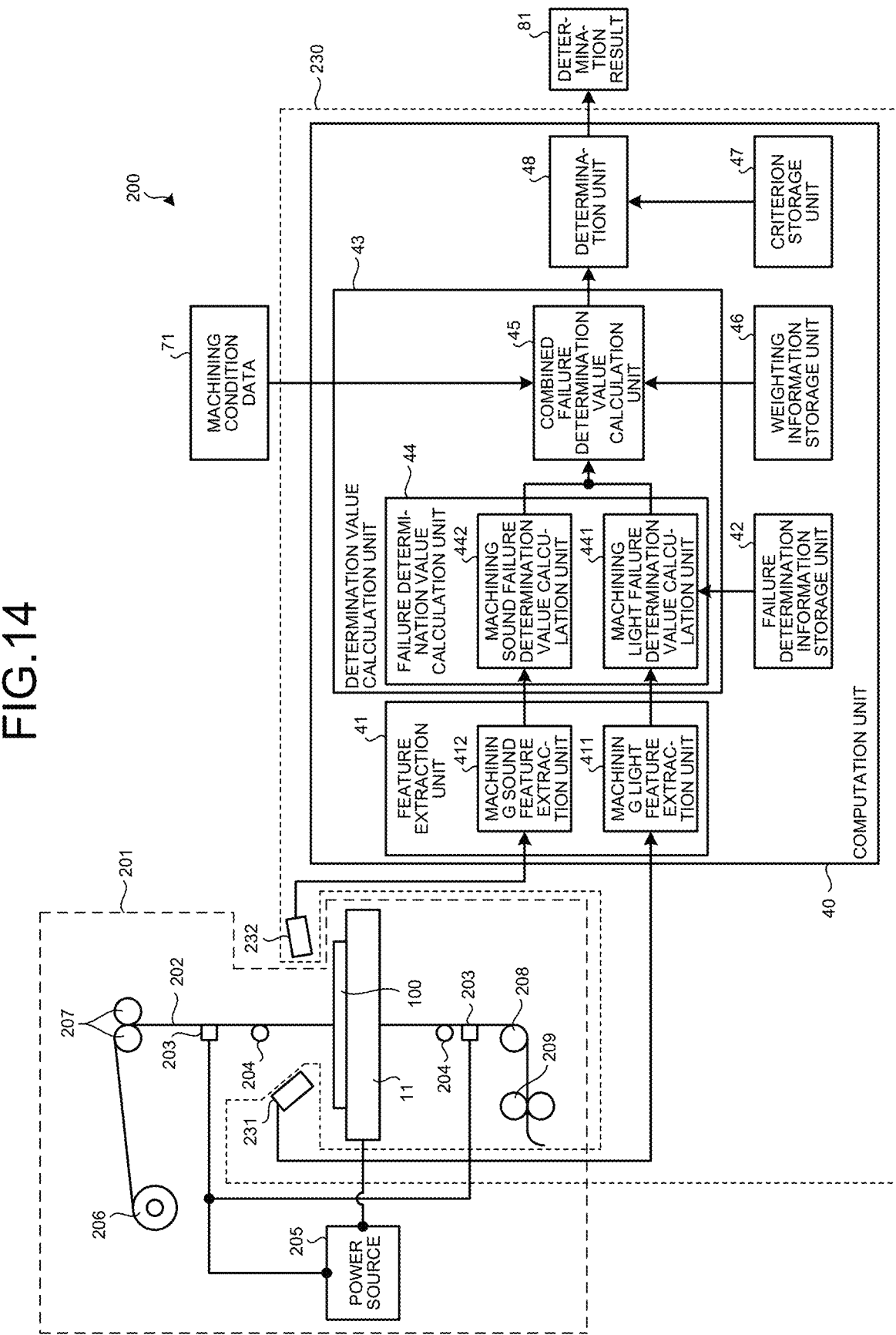
FIG. 14 is a diagram schematically illustrating an exemplary configuration of a wire spark machining apparatus according to a sixth embodiment.

FIG. 14 is a diagram schematically illustrating an exemplary configuration of a wire electrical discharge machining apparatus according to the sixth embodiment. Note that components identical to those in the first embodiment are denoted by the same reference signs, and the description thereof will be omitted. The wire electrical discharge machining apparatus 200 includes an electrical discharge machining unit 201 and a machining failure detection unit 230. The electrical discharge machining unit 201 performs machining with discharge pulses from a wire 202 proximate to the workpiece 100 in a machining fluid. The machining failure detection unit 230 is a machining failure detection device that detects a failure of electrical discharge machining in the electrical discharge machining unit 201.

The electrical discharge machining unit 201 includes the stage 11, the wire 202, a power source 205, a wire bobbin 206, a pair of power feeders 203, and a pair of dies 204. The stage 11 has the workpiece 100 placed thereon. The wire 202 is an electrode for applying discharge pulses to the workpiece 100. The wire bobbin 206 feeds the wire 202 therefrom. The pair of power feeders 203 is in contact with the wire 202. The pair of dies 204 supports the wire 202. The wire 202 is located a predetermined distance from a position of the workpiece 100 to be machined. The power source 205 is connected to the power feeders 203 and the stage 11, and applies a pulse voltage between the power feeders 203, that is, between the wire 202, and the workpiece 100. The pulse voltage is a discharge pulse voltage that produces discharge between the wire 202 and the workpiece 100. The electrical discharge machining unit 201 includes a feed roller 207, a collection roller 209, and a lower roller 208. The feed roller 207 allows the wire 202 fed from the wire bobbin 206 to move toward the workpiece 100. The collection roller 209 collects the wire 202. The lower roller 208 allows the wire 202 having passed through the workpiece 100 to move toward the collection roller 209. In addition, in the case where the electrical discharge machining unit 201 performs shaping machining, at least one or more drive devices (not illustrated) are provided to change the relative positional relationship between the wire 202 and the workpiece 100.

As in the first to fifth embodiments, the machining failure detection unit 230 measures light and sound generated when the electrical discharge machining unit 201 is performing electrical discharge machining on the workpiece 100, and determines whether a failure has occurred in electrical discharge machining on the basis of the measurement result. As in the first to fifth embodiments, the machining failure detection unit 230 includes a machining light measurement unit 231, a machining sound measurement unit 232, and the computation unit 40.

The machining light measurement unit 231 measures machining light caused by discharge pulses generated by the discharge voltage applied between the workpiece 100 and the wire 202 during electrical discharge machining, and outputs, to the computation unit 40, a machining light signal in which the measured beams of machining light are arranged in time series. The machining light measurement unit 231 is similar to the machining light measurement unit 31 in the first to fifth embodiments, and is equipped with an optical sensor or a spectrometer.

The machining sound measurement unit 232 measures machining sound generated around the machining point during electrical discharge machining, and outputs, to the computation unit 40, a machining sound signal in which the measured machining sounds are arranged in time series. Machining sound will be described in more detail. When the discharge pulse current flows from the wire 202 to the workpiece 100, the sound of the current machining the workpiece 100 is measured as machining sound. Alternatively, at this time, the machining fluid in the vicinity of the point of occurrence of discharge has a high temperature of several thousand degrees, and thus rapidly vaporizes and explodes to thereby generate bubbles. With this phenomenon, the machining fluid in the vicinity is subjected to a rapid pressure change, which is propagated as ultrasonic shock waves and measured as machining sound.

When a large discharge pulse current is applied from the wire 202 to the workpiece 100, a large amount of metal is removed from the workpiece 100 by the discharge. As a result, the machining speed increases, and the surface roughness increases as well. In addition, discharge timing, which is spontaneously determined by the distance between the wire 202 and the workpiece 100, varies depending on the situation of the wire 202 vibrating in response to being subjected to discharge reaction force. The discharge strengthens as the wire 202 approaches the workpiece 100 but weakens as the wire 202 moves away from the workpiece 100. As a result, machining light and machining sound are time-series data that depend on the discharge energy, discharge timing, discharge duration time, and discharge waveform.

As in the case of the laser cutting apparatus according to the first to fifth embodiments, the computation unit 40 extracts a machining sound feature and a machining light feature, and subsequently performs machining failure determination on each of the features or a combination thereof. In the case of the electrical discharge machining apparatus, the computation unit 40 extracts and analyzes features such as intensity, intensity variation, frequency, and timing variation from the time-series data on machining light and machining sound measured at the time of applying each discharge pulse. As a result, it is possible to detect spark discharge due to discharge concentration and thus identify wire disconnection, generation of flaws on the machined surface, surface roughness deterioration, or the like. Note that FIG. 14 illustrates the computation unit 40 having the same configuration as the computation unit 40 described in the first embodiment. However, the computation unit 40 may have any of the configurations in the first to fifth embodiments.

As in the case of the laser cutting apparatus according to the first to fifth embodiments, the easiness of quality verification with machining sound or machining light varies depending on the thickness and shape of the workpiece 100 and the generated failure.

Figure 15:
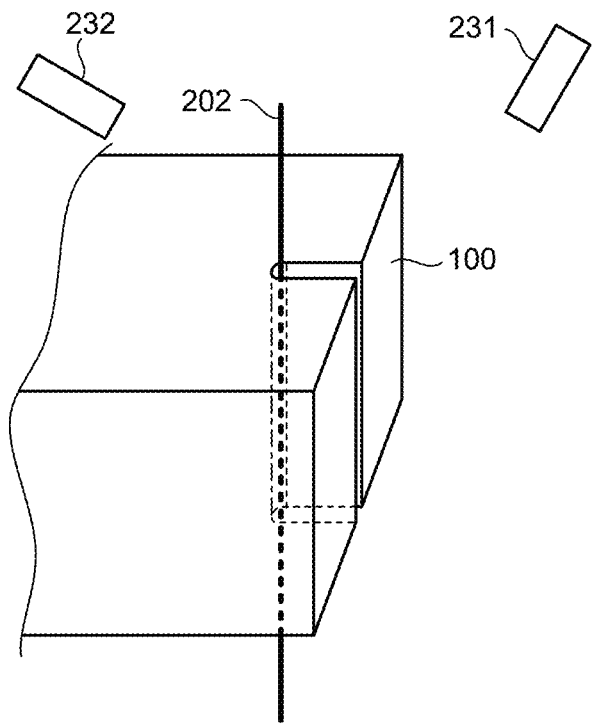
FIG. 15 is a diagram schematically illustrating an exemplary situation at the start of spark machining on a thick workpiece.
Figure 16:
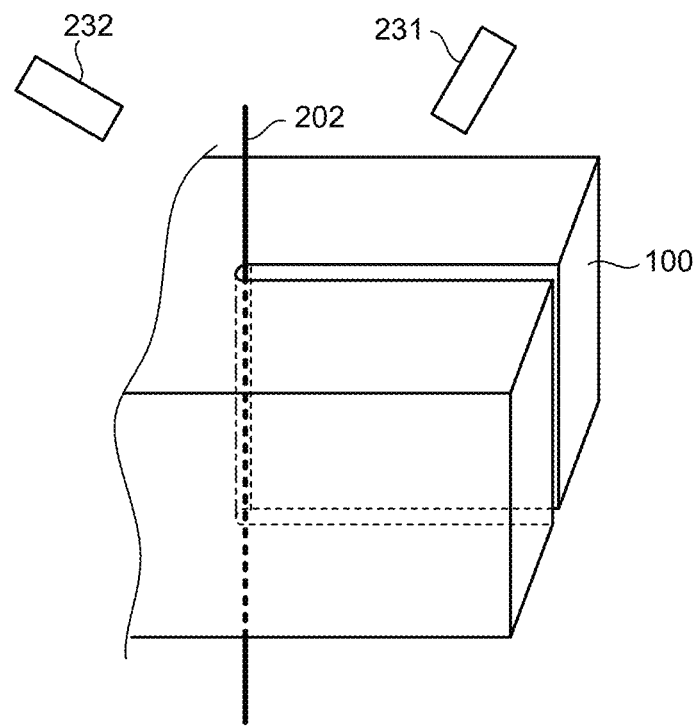
FIG. 16 is a diagram schematically illustrating an exemplary situation of the progress of spark machining on the thick workpiece in FIG. 15.

First, a description will be made as to measurement of machining light during electrical discharge machining. FIG. 15 is a diagram schematically illustrating an exemplary situation at the start of electrical discharge machining on a thick workpiece. FIG. 16 is a diagram schematically illustrating an exemplary situation of the progress of electrical discharge machining on the thick workpiece in FIG. 15. The normal width of a cut groove formed by the wire electrical discharge machining apparatus 200 is equivalent to the sum of the diameter of the wire 202 and twice the gap between the workpiece 100 and the wire 202. Because the wire 202 typically has a diameter in the range of 0.02 mm to 0.3 mm, the cut groove width is about 0.5 mm at the widest. For this reason, as illustrated in FIG. 15, when the cut length, or cut amount, is short, it is easy to measure machining light through the opening of the cut even though the workpiece 100 is thick. However, as illustrated in FIG. 16, as the machining progresses and the cut amount becomes long, it becomes gradually difficult to measure machining light through the opening because the slit width is narrow. In particular, it is difficult to measure machining light caused by discharge generated at a position below the center in the thickness direction of the workpiece 100.

Figure 17:
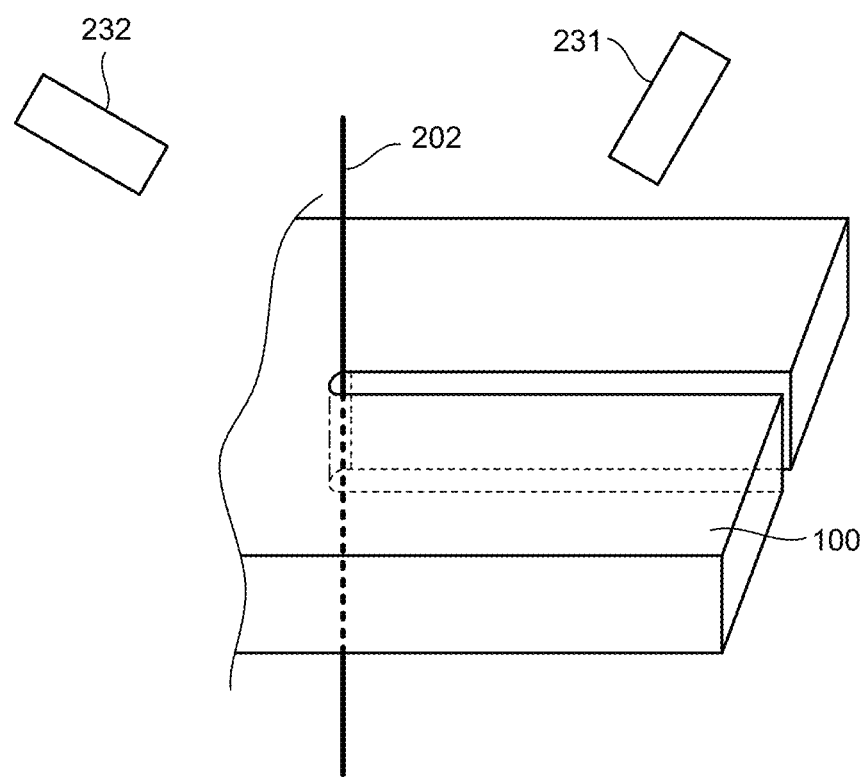
FIG. 17 is a diagram schematically illustrating an exemplary situation of the progress of spark machining on a thin workpiece.

FIG. 17 is a diagram schematically illustrating an exemplary situation of the progress of electrical discharge machining on a thin workpiece. In FIG. 17, the situation is similar to that in FIG. 16 but the workpiece 100 is thinner than that in FIG. 16. As illustrated in FIG. 17, in the case of the thin workpiece 100, it is easy to measure machining light even when the cut amount is long, and it is possible to determine the occurrence of machining failure. Regarding the above description of the thickness of the workpiece 100, the relevant description in the first embodiment can be applied mutatis mutandis.

Next, a description will be made as to measurement of machining sound during electrical discharge machining. A microphone or the like detects a sound propagated in the air to thereby measure the machining sound. Alternatively, a sensor installed on the surface of the workpiece 100 is used to measure sound waves propagated inside the workpiece 100, thereby measuring the machining sound. In addition, a plurality of sensors can be used so as to identify a position of occurrence of discharge, from a difference in the time of detection of sound wave. Machining sound measurement is thus effective regardless of the thickness of the workpiece 100 or the position of occurrence of discharge. However, since the range of frequencies measurable through measurement of machining sound is lower than that through measurement of machining light, it is difficult to analyze discharge waveforms with high resolution. The measurement of machining light measurement is thus more advantageous than the measurement of machining sound for analyzing the discharge of a short pulse of one microsecond or less, for example.

Note that the determination of the occurrence of machining failure in the wire electrical discharge machining apparatus 200 according to the sixth embodiment is similar to that described in the first to fifth embodiments, and thus the description thereof will be omitted.

Although the sixth embodiment has been described giving the example of the wire electrical discharge machining apparatus 200, the machining failure detection device may be applied to a die-sinking electrical discharge machining apparatus that uses a mold instead of the wire 202 as an electrode, in which case it is similarly easy to detect, for example, deterioration of the electrode, or deterioration of machined surface roughness due to current concentration. As described above, the machining failure detection device according to the first to fifth embodiments can be applied to electrical discharge machining apparatuses including the wire electrical discharge machining apparatus 200 and a die-sinking electrical discharge machining apparatus.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 1 laser cutting apparatus; 10 laser cutting unit; 11 stage; 12 laser oscillator; 13 machining head; optical fiber; 30, 230 machining failure detection unit; 31, 231 machining light measurement unit; 32, 232 machining sound measurement unit; 40 computation unit; 41 feature extraction unit; 42 failure determination information storage unit; 43, 43a, 43b determination value calculation unit; 44 failure determination value calculation unit; 45 combined failure determination value calculation unit; 46 weighting information storage unit; 47 criterion storage unit; 48 determination unit; 49 combined feature extraction unit; 50 machine learning unit; 51 learning unit; 52 data acquisition unit; 71 machining condition data; 72 machining failure data; 73 machining failure state value; 81 determination result; 100 workpiece; 131 optical system; 132 machining nozzle; 200 wire electrical discharge machining apparatus; 201 electrical discharge machining unit; 202 wire; 203 power feeder; 204 die; 205 power source; 206 wire bobbin; 207 feed roller; 208 lower roller; 209 collection roller; 411 machining light feature extraction unit; 412 machining sound feature extraction unit; 441 machining light failure determination value calculation unit; 442 machining sound failure determination value calculation unit.

The invention claimed is:
1. A laser cutting apparatus, comprising:
a machining failure detection device including:
a processor to execute a program: and
a memory to store the program that, when executed by the processor, performs:
a machining light measurement process of measuring machining light generated at a machining point during machining;
a machining sound measurement process of measuring machining sound generated at the machining point; and
a computation process of determining whether a machining failure has occurred in the machining, wherein
the computation process includes:
a feature extraction process of extracting a machining light feature from a machining light signal measured by the machining light measurement process, and extracting a machining sound feature from a machining sound signal measured by the machining sound measurement process;
a determination value calculation process of calculating a combined failure determination value on a basis of the machining light feature and the machining sound feature; and
a determination process of comparing the combined failure determination value with a determination criterion to determine whether the machining failure has occurred, wherein
the determination value calculation process calculates the combined failure determination value by weighting the machining light feature and the machining sound feature, as defined in accordance with a machining condition, and combining the weighted features,
wherein the machining is laser cutting,
the laser cutting apparatus further comprising:
a stage on which a workpiece to be subjected to the laser cutting is placed:
a laser oscillator; and
a machining head that irradiates the machining point with laser light from the laser oscillator.

2. The laser cutting apparatus according to claim 1, wherein the determination value calculation process obtains a combined feature by performing computation processing on the machining light feature and the machining sound feature, the computation processing being defined in accordance with a machining condition or in accordance with a type of machining failure and a machining condition, and the determination value calculation process calculates the combined failure determination value, using the combined feature.

3. The laser cutting apparatus according to claim 2, wherein
the feature extraction process extracts m (m is a natural number) types of the machining light features and n (n is a natural number) types of the machining sound features,
the determination value calculation process calculates the combined feature by performing the computation processing, using the m types of machining light features and the n types of machining sound features, the computation processing being defined in accordance with the machining condition or in accordance with the type of machining failure and the machining condition, and
at least one of m and n is a natural number of two or more.

4. A laser cutting apparatus, comprising:
a machining failure detection device including:
a processor to execute a program; and
a memory to store the program that, when executed by the processor, performs:
a machining light measurement process of measuring machining light generated at a machining point during machining;
a machining sound measurement process of measuring machining sound generated at the machining point; and
a computation process of determining whether a machining failure has occurred in the machining, wherein
the computation process includes:
a feature extraction process of extracting a machining light feature from a machining light signal measured by the machining light measurement process, and extracting a machining sound feature from a machining sound signal measured by the machining sound measurement process;
a determination value calculation process of calculating a combined failure determination value on a basis of the machining light feature and the machining sound feature; and a determination process of comparing the combined failure determination value with a determination criterion to determine whether the machining failure has occurred, wherein the determination value calculation process calculates the combined failure determination value by weighting, as defined in accordance with a machining condition, a machining light failure determination value and a machining sound failure determination value calculated using the machining light feature and the machining sound feature, wherein the machining is laser cutting, the laser cutting apparatus further comprising:

a stage on which workpiece to be subjected to the laser cutting is placed;

a laser oscillator; and a machining head that irradiates the machining point with laser light from the laser oscillator.

5. The laser cutting apparatus according to claim 4, wherein the determination value calculation process consults weighting information in which a combination of the machining condition and a type of the machining failure is associated with a weight, and calculates the combined failure determination value using the weight defined for a combination of machining condition data in the machining and machining failure data indicating all the type of the machining failure to be detected.

6. The laser cutting apparatus according to claim 5, wherein the determination value calculation process calculates the combined failure determination value, selectively using the machining light signal from the machining light measurement process and the machining sound signal from the machining sound measurement process in accordance with the type of the machining failure to be detected.

7. The laser cutting apparatus according to claim 5, wherein the computation process further includes a machine learning process of learning the machining light feature, the machining sound feature, and the machining condition.

8. The laser cutting apparatus according to claim 7, wherein the machine learning process further learns the weight.

9. The machining failure detection device according to claim 5, wherein the weighting information has the weight for each combination of priority in the machining, the machining condition, and the type of machining failure.

10. The laser cutting apparatus according to claim 4, wherein;

the machining light failure determination value and the machining sound failure determination value are degrees of matching between the machining light feature and the machining sound feature and failure determination criteria for identifying the machining light feature and the machining sound feature as a machining failure, and the machining failure includes types of machining failure, the determination value calculation process calculates the machining light failure determination values and the machining sound failure determination values for all of the types of machining failure, the calculated machining light failure determination values including the highest degree of matching, the calculated machining sound failure determination values including the highest degree of matching, and the determination value calculation process determines that the machining failure has not occurred when the highest degrees of matching are less than a preset threshold.

11. An electrical discharge machining apparatus comprising:

a machining failure detection device including:

a processor to execute a program: and a memory to store the program that, when executed by the processor, performs:

a machining light measurement process of measuring machining light generated at a machining point during machining;

a machining sound measurement process of measuring machining sound generated at the machining point; and a computation process of determining whether a machining failure has occurred in the machining, wherein the computation process includes:

a feature extraction process of extracting a machining light feature from a machining light signal measured by the machining light measurement process, and extracting a machining sound feature from a machining sound signal measured by the machining sound measurement process:

a determination value calculation process of calculating a combined failure determination value on a basis of the machining light feature and the machining sound feature; and a determination process of comparing the combined failure determination value with a determination criterion to determine whether the machining failure has occurred, wherein the determination value calculation process calculates the combined failure determination value by weighting the machining light feature and the machining sound feature, as defined in accordance with a machining condition, and combining the weighted features, wherein the machining is electrical discharge machining, the electrical discharge machining apparatus further comprising:

a stage on which a workpiece to be subjected to the electrical discharge machining is placed;

an electrode located at a predetermined distance from a position of the workpiece to be machined; and a power source to apply a discharge pulse voltage between the stage and the electrode.

12. An electrical discharge machining apparatus comprising:

a machining failure detector, the machining being electrical discharge machining, the machining failure detector including:

a processor to execute a program: and a memory to store the program that, when executed by the processor, performs:

a machining light measurement process of measuring machining light generated at a machining point during machining;

a machining sound measurement process of measuring machining sound generated at the machining point; and a computation process of determining whether a machining failure has occurred in the machining, wherein the computation process includes:

a feature extraction process of extracting a machining light feature from a machining light signal measured by the machining light measurement process, and extracting a machining sound feature from a machining sound signal measured by the machining sound measurement process;

a determination value calculation process of calculating a combined failure determination value on a basis of the machining light feature and the machining sound feature; and a determination process of comparing the combined failure determination value with a determination criterion to determine whether the machining failure has occurred, wherein the determination value calculation process calculates the combined failure determination value by weighting, as defined in accordance with a machining condition, a machining light failure determination value and a machining sound failure determination value calculated using the machining light feature and the machining sound feature, the electrical discharge machining apparatus further comprising:

a stage on which a workpiece to be subjected to the electrical discharge machining is placed;

an electrode located at a predetermined distance from a position of the workpiece to be machined; and a power source to apply a discharge pulse voltage between the stage and the electrode.

\* \* \* \* \*